United States Patent [19]

Hirama

[11] Patent Number: 5,129,399
[45] Date of Patent: Jul. 14, 1992

[54] METHOD AND SYSTEM FOR DETECTING ECHO SIGNALS BY SIMULTANEOUS RECEPTION IN ULTRASOUND DIAGNOSIS APPARATUS

[75] Inventor: Makoto Hirama, Ootawara, Japan

[73] Assignee: Kabushiki Kaisha Toshiba, Kawasaki, Japan

[21] Appl. No.: 536,466

[22] Filed: Jun. 12, 1990

[30] Foreign Application Priority Data

Jun. 13, 1989 [JP] Japan .................................. 1-150181

[51] Int. Cl.$^5$ ................................................ A61B 8/00
[52] U.S. Cl. ................................... 128/661.01; 73/626
[58] Field of Search .................... 128/661.01, 660.01; 73/625, 626

[56] References Cited

U.S. PATENT DOCUMENTS

| | | | |
|---|---|---|---|
| 4,058,003 | 11/1977 | Macovski | 73/626 |
| 4,159,462 | 6/1979 | Rocha et al. | 128/661.01 X |
| 4,448,076 | 5/1984 | van Heelsbergen | 73/626 |
| 4,487,073 | 12/1984 | Sumino | 73/626 |
| 4,622,634 | 11/1986 | Fidel | 128/661.01 X |
| 4,644,795 | 2/1987 | Augustine | 128/661.01 X |
| 4,779,622 | 10/1988 | Nakamura et al. | 73/626 X |
| 4,949,310 | 8/1990 | Smith et al. | 128/660.01 X |

OTHER PUBLICATIONS

C. Yoshida et al., "Real Time Speckle Reduction in Ultrasound Imaging," Japan J. Med. Ultrasonics, vol. 13, No. 5 (1986), pp. 305-314.

Primary Examiner—Francis Jaworski
Attorney, Agent, or Firm—Finnegan, Henderson, Farabow, Garrett and Dunner

[57] ABSTRACT

In an ultrasound diagnosis apparatus, a focusing point of received ultrasound beams is moved along a transmission direction of the ultrasound beams so as to receive echo signals at all the focusing points on a scan line by one transmission operation. Reception opening portions of an ultrasound probe are changed to receive and add the echo signals in a plurality of directions at the respective focusing points, thereby reducing a speckle noise.

9 Claims, 7 Drawing Sheets

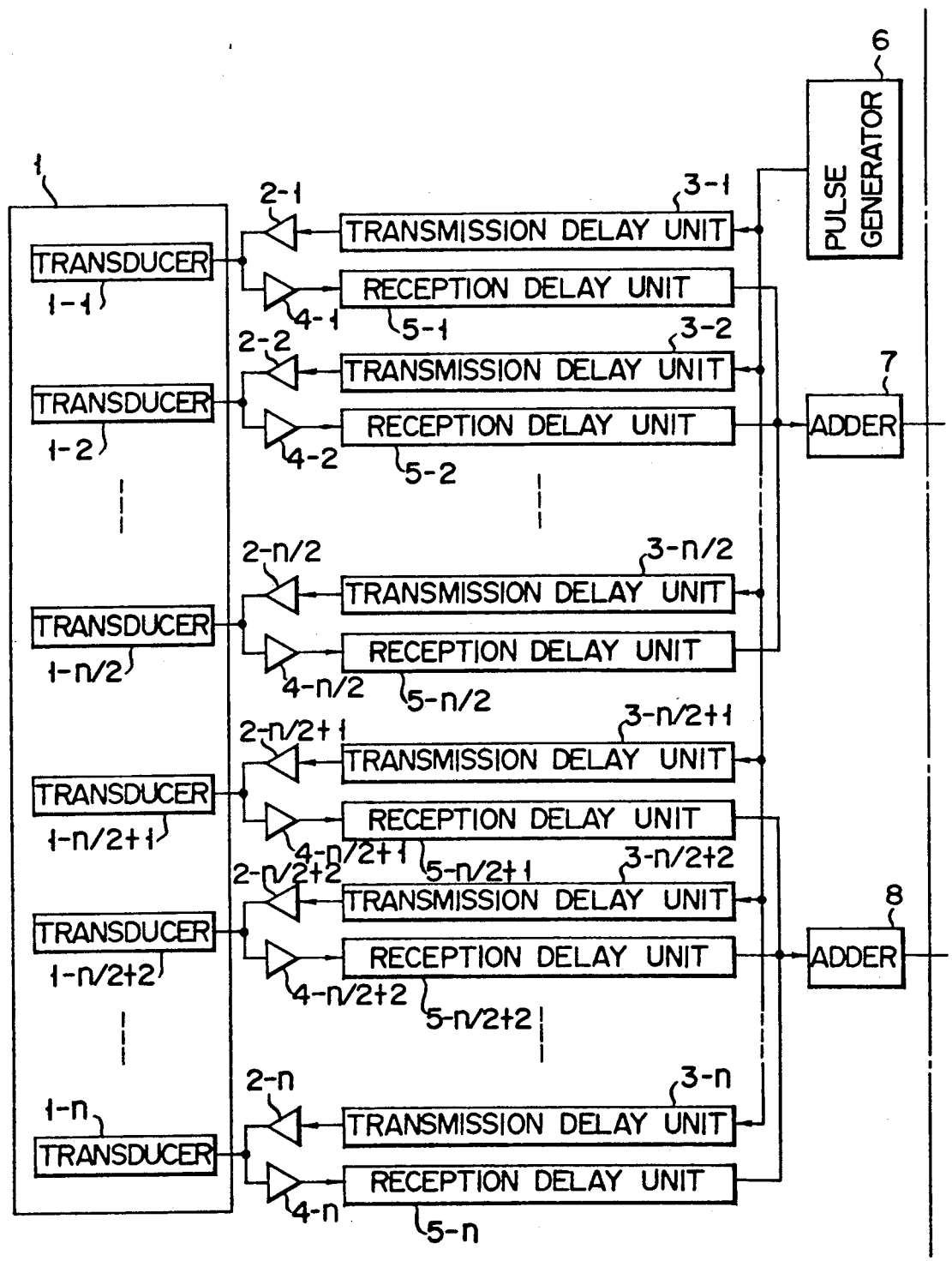
F I G. 1A

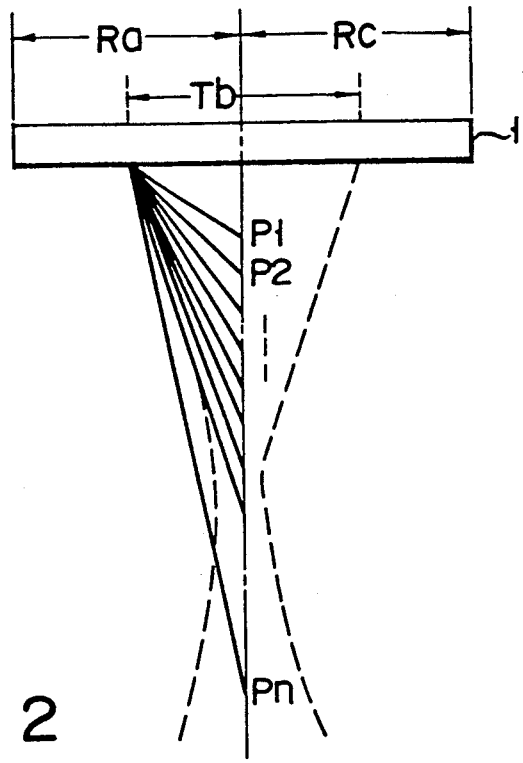
F I G. 2
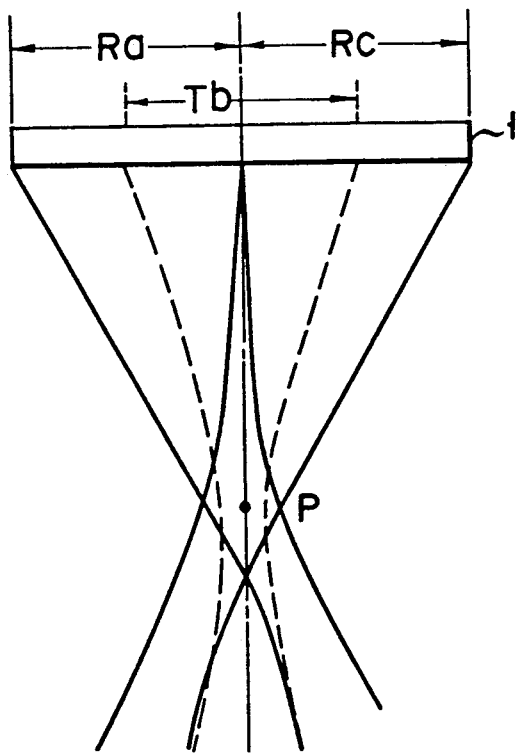
F I G. 3

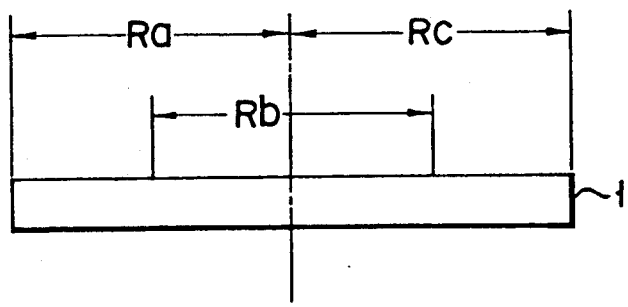
F I G. 4
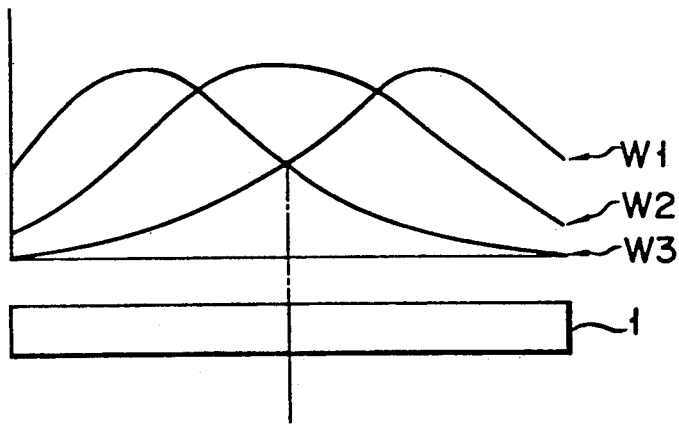
F I G. 5

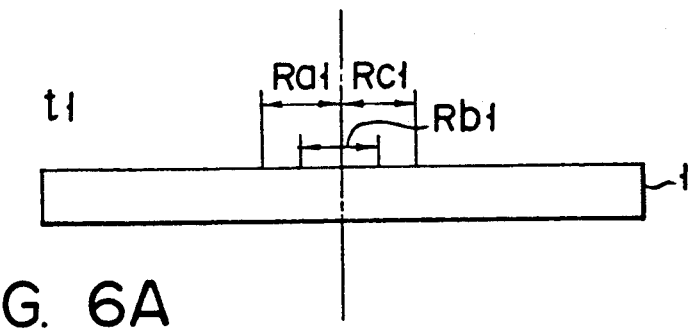
F I G. 6A
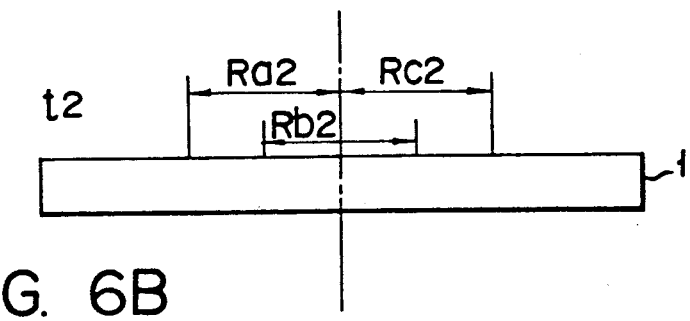
F I G. 6B
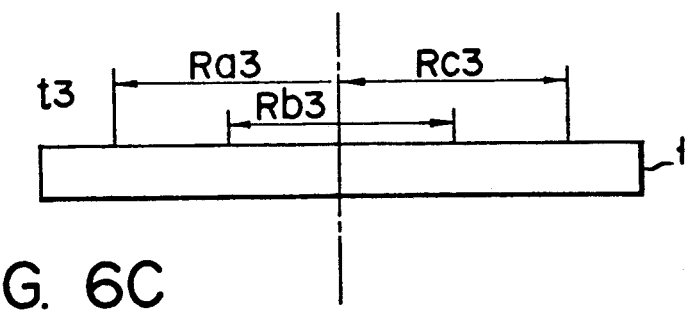
F I G. 6C

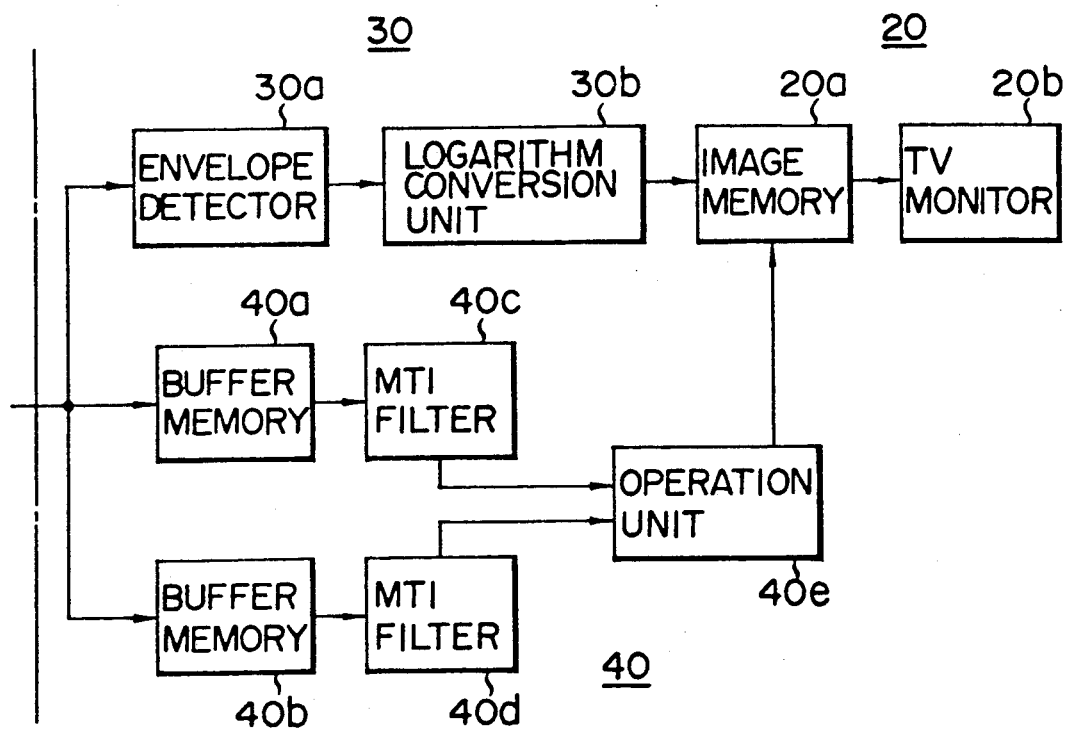
F I G. 8B
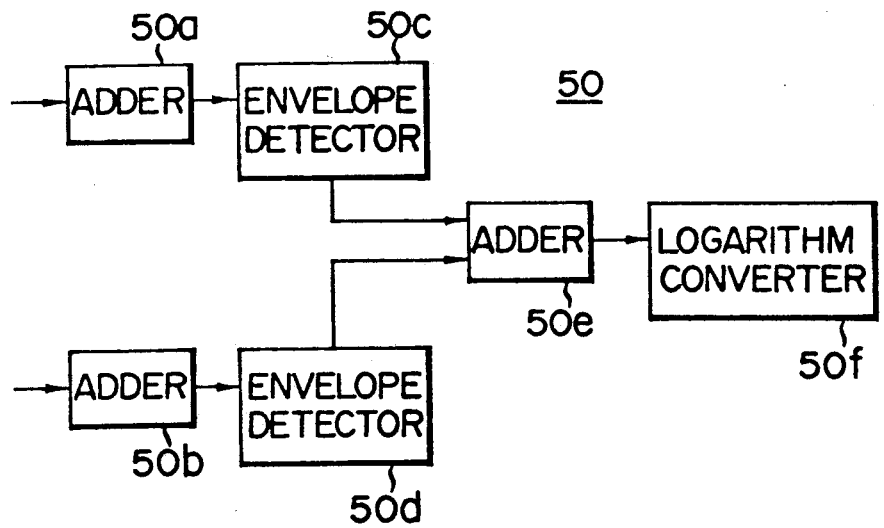
F I G. 7

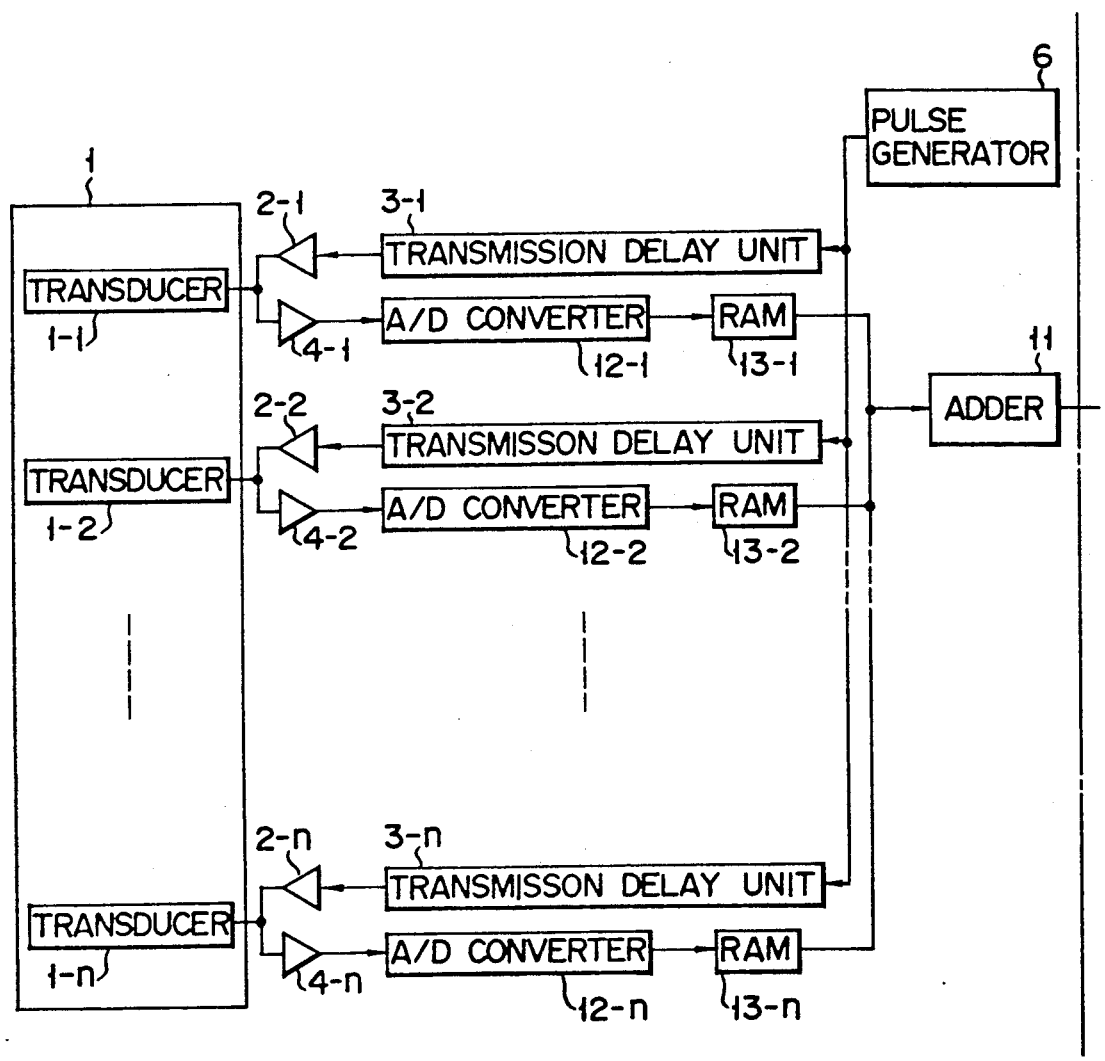
F I G. 8A

METHOD AND SYSTEM FOR DETECTING ECHO SIGNALS BY SIMULTANEOUS RECEPTION IN ULTRASOUND DIAGNOSIS APPARATUS

BACKGROUND OF THE INVENTION

1. Field of the Invention

The present invention relates to a method and system for detecting echo signals by simultaneous reception in an ultrasound diagnosis apparatus.

2. Description of the Related Art

When linear scanning is to be performed in an ultrasound diagnosis apparatus having an ultrasound probe in which a plurality of transducers are arranged, the transducers are sequentially driven to transmit an ultrasound beam, and an ultrasound beam reflected by an object to be examined is received as an echo signal by the same transducer which is driven to transmit the ultrasound beam. In this case, ultrasound beams reflected by the object to be examined are focused (electron-focused) by shifting drive timings of transducers arranged in a central portion of the ultrasound probe from those of transducers arranged in its end portions.

In order to perform sector scanning, drive timings of the transducers are changed to form a sector transmission area of ultrasound beams, thereby receiving echo signals.

Image display methods are classified into B mode image display for displaying an ultrasound tomographic image obtained by synthesizing echo signals and M mode image display for displaying a time change in ultrasound transmission/reception signals. The M mode is used in diagnosis of an organ which rapidly moves such as a heart. Doppler image display is performed by using an ultrasound Doppler effect in which the frequency of an echo signal from a moving object is shifted in proportion to the speed of the moving object. That is, information of a moving object in a depth position corresponding to the echo signal is obtained by detecting a frequency shift of an echo signal from a living body. Therefore, information of, e.g., a blood flow direction, a blood flow state, a blood flow pattern, and a blood flow rate on a predetermined slice in a living body can be displayed.

A speckled pattern called a speckle appears in a B mode image obtained by an ultrasound diagnosis apparatus. This pattern is produced when ultrasound beams from transducers arranged in an ultrasound probe are incident on small scattered bodies and waves (echo signals) reflected by the small scattered bodies interfere with each other. Therefore, this speckle is caused by coherency of an ultrasound beam.

That is, since phases of ultrasound beams transmitted in a living body coincide with each other, echo signals from a large number of scattering portions present in the living body interfere with each other on the receiving surface of the ultrasound probe. Therefore, fluctuation occurs in an amplitude of the echo signal to produce a speckled pattern, i.e., a speckle on the B mode image, thereby degrading image quality.

As a method of reducing speckle noise, a real-time reducing method for speckle noise in a B mode image is available. For example, a plurality of echo signals are obtained by spatial compound scanning in which transmission/reception is performed with respect to a predetermined observation point in a living body while an ultrasound probe is moved. The obtained echo signals are input to a plurality of filters having different pass bands. Output signals from the filters are subjected to envelope detection and added to each other. Accordingly, a scanning corresponding to frequency compound scanning is performed. After a plurality of echo signals obtained by spatial compound scanning are processed as described above, the processed signals are superimposed with each other. By performing the above processing for a predetermined portion in a living body, an ultrasound image in which a speckle noise is reduced can be obtained in real time by the two compound scanning.

In this method, however, a long time period is required to display an image because echo signals are obtained by moving the ultrasound probe. In addition, since it takes a long time period to obtain echo signals in different directions from an observation point in a living body, this method cannot be applied to a moving object. Furthermore, if a correct position and a correct angle of a moving ultrasound probe cannot be obtained, a positional deviation occurs in an observation point.

For the above reasons, a demand has arisen for an ultrasound diagnosis apparatus which can display an ultrasound image with reduced speckle noise in real time.

SUMMARY OF THE INVENTION

It is an object of the present invention to provide a method and system for detecting echo signals by a simultaneous reception in an ultrasound diagnosis apparatus.

According to one aspect of the present invention, there is provided a method for detecting echo signals by a simultaneous reception in an ultrasound diagnosis apparatus, the method comprising the steps of:

transmitting an ultrasound beam to a desired point;

setting a plurality of ultrasound reception sections;

receiving the echo signals from the desired point by the set ultrasound reception sections at the same time, each of the echo signals being received by each of corresponding ultrasound reception sections;

adding the received echo signals; and obtaining an ultrasound image from the added echo signals.

According to another aspect of the present invention, there is provided a system for detecting echo signals by a simultaneous reception in an ultrasound diagnosis apparatus, the system comprising:

an ultrasound probe having a plurality of transducers, the transducers being divided into a plurality of transducer groups, one of the transducer groups being driven to transmit an ultrasound beam to a desired point of the subject and each of the transducer groups being driven to receive echo signals from the desired point at the same time;

adding means for adding the echo signals; and obtaining means for obtaining an ultrasound image from the added echo signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are block diagrams showing an arrangement of a system according to the first embodiment of the present invention;

FIGS. 2 and 3 are views for explaining a transmission/reception focusing point;

FIGS. 4 and 5 are views for explaining a reception opening portion of an ultrasound probe;

FIGS. 6A to 6C are views showing a time change in a width of the reception opening portion of the ultrasound probe;

FIG. 7 is a block diagram showing another arrangement of a B mode processing unit shown in FIG. 1B; and FIGS. 8A and 8B are block diagrams showing an arrangement of a system according to the second embodiment of the present invention.

DETAILED DESCRIPTION OF THE PREFERRED EMBODIMENTS

Figure 1B:
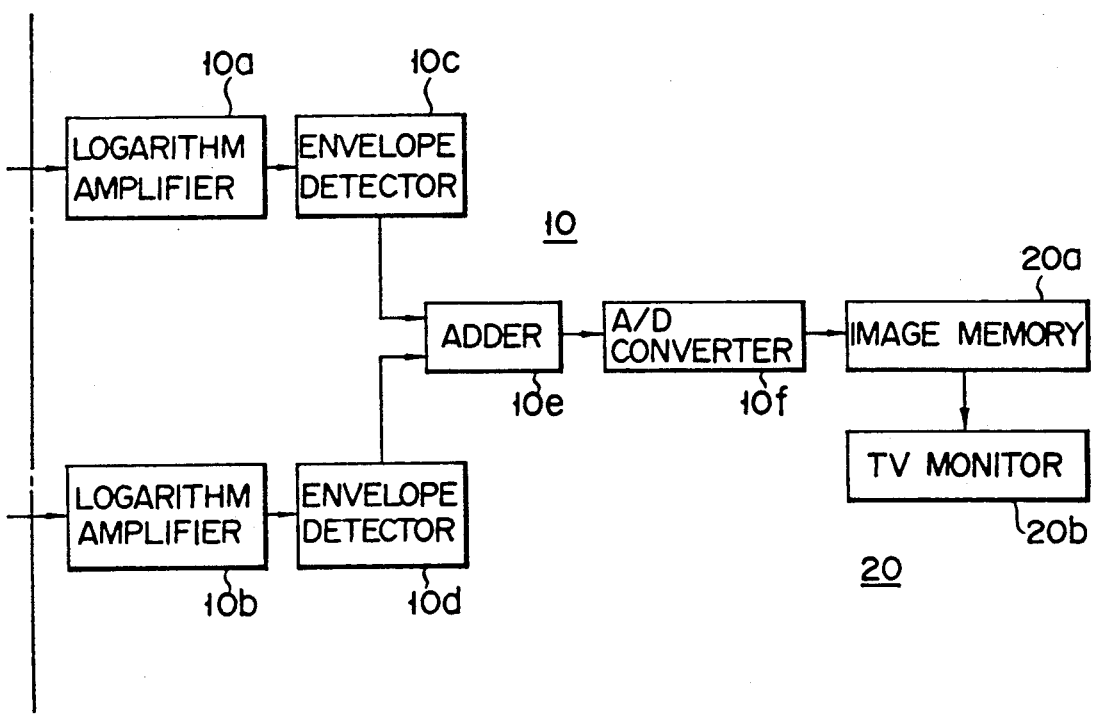

Embodiments of the present invention will be described in detail below with reference to the accompanying drawings.

Referring to FIGS. 1A and 1B, a system according to the first embodiment comprises an ultrasound probe 1 having transducers 1-1 to 1-n, pulser 2-1 to 2-n, transmission delay units 3-1 to 3-n, preamplifiers 4-1 to 4-n, reception delay units 5-1 to 5-n, a pulse generator 6, adders 7 and 8, a B mode processing unit 10, and a display unit 20.

The pulse generator 6 generates repetitive pulse signals for determining a transmission interval of an ultrasound beam.

The transmission delay units 3-1 to 3-n give predetermined delay times determined on the basis of a transmission direction and a focusing point of the ultrasound beams to the generated repetitive pulse signals.

The pulsers 2-1 to 2-n generate drive pulse signals for driving the transducers 1-1 to 1-n.

The transducers 1-1 to 1-n transmit ultrasound beams to an object to be examined and receive ultrasound beams reflected by the object as echo signals in different directions by two transducer groups 1-1 to 1-n/2 and 1-n/2+1 to 1-n respectively corresponding to two reception opening portions not overlapping each other. The width of each reception opening portion is set by a switch (not shown).

The reception delay units 5-1 to 5-n/2 and 5-n/2+1 to 5-n set a focusing point of the ultrasound beams received by the transducer groups 1-1 to 1-n/2 and 1-n/2+1 to 1-n onto substantially the central axis of the transmitted ultrasound beams and controls delay times so that the focusing point moves along the central axis.

The adders 7 and 8 add the echo signals from the reception delay units 5-1 to 1-n/2 and 5-n/2+1 to 5-n.

The B mode processing unit 10 has logarithm amplifiers 10a and 10b, envelope detectors 10c and 10d, an adder 10e, and an A/D (analog/digital) converter 10f, and performs processing for obtaining an ultrasound tomographic image.

The display unit 20 has an image memory 20a and a TV monitor 20b, and displays the ultrasound tomographic image obtained by the B mode processing unit 10.

An operation of the first embodiment system will be described below.

When the transducers 1-1 to 1-n are driven by the pulse generator 6, the transmission delay units 3-1 to 3-n, and the pulsers 2-1 to 2-n, ultrasound beams are transmitted to an object to be examined. Ultrasounds reflected by the object are received as echo signals by the two transducer groups 1-1 to 1-n/2 and 1-n/2+1 to 1-n. The received echo signals are supplied to the reception delay units 5-1 to 5-n/2 and 5-n/2+1 to 5-n via the preamplifiers 4-1 to 4-n. As a result, predetermined delay times are given to the echo signals.

In this case, by using a dynamic focus method, the delay times given by the reception delay units 5-1 to 5-n change in accordance with an ultrasound propagation time.

As shown in FIG. 2, by moving the focusing points P1, P2, ..., Pn of the received ultrasound beams along the transmission direction of the ultrasound beams from a transmission opening portion Tb, echo signals at all the focusing points on a scan line are received by reception opening portions Ra and Rc by one transmission operation. The echo signals received from the focusing points are added by the adders 7 and 8 and supplied to the adder 10e via the logarithm amplifiers 10a and 10b and the envelope detectors 10c and 10d. The echo signal output from the adder 10e is converted into a digital signal by the A/D converter 10f and displayed as an ultrasound tomographic image on the TV monitor 20b via the image memory 20a.

In this manner, echo signals in different directions are simultaneously received by a plurality of reception opening portions by transmitting ultrasound beams once. The received echo signals are added to display an ultrasound image with less speckle noise.

In addition, by giving delay times to the echo signals from the transducers so as to move the focusing point of the ultrasound beams on a scan line, the echo signals from all the focusing points on the scan line can be obtained by one transmission operation.

The focusing point is moved from P1 to Pn as shown in FIG. 2 for the following reason. That is, if only one focusing point is present as shown in FIG. 3, the focusing point of transmitted ultrasound beams and that of received ultrasound beams do not coincide with each other except a focusing point P because the center of the transmission opening portion Tb is shifted from the centers of the reception opening portions Ra and Rc. Therefore, a high-resolution image cannot be obtained except the focusing point P.

As shown in FIG. 4, however, if a reception opening portion Rb having a portion overlapping both of the reception opening portions Ra and Rc not overlapping each other is provided so that echo signals are received and added by the reception opening portions Ra, Rb, and Rc, a speckle noise is reduced to be lower than that obtained when echo signals are received and added by the reception opening portions Ra and Rc as shown in FIG. 2. That is, as the number of simultaneous receiving directions is increased, the speckle noise can be reduced.

In addition, as shown in FIG. 5, predetermined weighting functions W1, W2, and W3 are set with respect to an arranged direction of the transducers, and echo signals from the transducers are multiplied using the predetermined weighting functions. A side-lobe level can be reduced by this multiplied processing. Note that the weighting functions are set by adjusting the gains of the preamplifiers 4-1 to 4-n to predetermined values.

Furthermore, as shown in FIGS. 6A to 6C, a switch is controlled such that reception opening portions are set to be (Ra1, Rb1, Rc1), (Ra2, Rb2, Rc2), and (Ra3, Rb3, Rc3) while echo signals on one scan line are obtained (e.g., at timings t1, t2, and t3). In general, when a focusing point is present in a short distance and a reception opening portion is large, a side-lobe level is increased. When a focusing point is present in a long distance, an S/N ratio is reduced since an echo signal level is reduced. Therefore, the width of a reception opening portion is set in accordance with an ultrasound propagation time. For example, if a focusing point is present in a short distance, the width of a reception opening portion is set narrower. If a focusing point is present in a long distance, the width of a reception opening portion is set wider. In this manner, the side lobe level is reduced to increase the S/N ratio.

Note that absolute values, squares of the absolute values, logarithms of the absolute values and the like are added for echo signals in a plurality of reception directions. The B mode processing unit 10 shown in FIG. 1B adds logarithms of absolute values of echo signals. As shown in FIG. 7, however, if a B mode processing unit having adders 50a, 50b, and 50e, envelope detectors 50c and 50d, and a logarithm converter 50f is used to add absolute values, a manufacturing cost can be reduced since only one expensive logarithm converter 50f need be used.

A system according to the second embodiment will be described below.

Referring to FIGS. 8A and 8B, the second embodiment system comprises an ultrasound probe 1 having transducers 1-1 to 1-n, pulsers 2-1 to 2-n, transmission delay units 3-1 to 3-n, preamplifiers 4-1 to 4-n, A/D converters 12-1 to 12-n, RAMs (or shift registers) 13-1 to 13-n, a pulse generator 6, an adder 11, a B mode processing unit 30, a D mode processing unit 40, and a display unit 20.

Echo signals from the transducers 1-1 to 1-n are amplified to a predetermined level by the preamplifiers 4-1 to 4-n, converted into digital signals by the A/D converters 12-1 to 12-n, and temporarily stored in the RAMs 13-1 to 13-n, respectively. After predetermined times corresponding to delay times of the respective signals elapse, the echo signals stored in the RAMs 13-1 to 13-n are supplied to and added by the adder 11. A addition signal is supplied to the B and D mode processing units 30 and 40.

The B mode processing unit 30 comprises an envelope detector 30a having an absolute circuit and a low-pass filter (not shown) and a logarithm conversion unit 30b having a ROM (not shown). An envelope of the addition signal from the adder 11 is detected by the envelope detector 30a and logarithm-converted by the logarithm conversion unit 30b. Echo signals from a plurality of reception direction can be obtained by a signal unit by driving digital circuits at a time division.

The D mode processing unit 40 comprises buffer memories 40a and 40b, MTI (moving target indicator) filters 40c and 40d, and an operation unit 40e, and performs processing for obtaining a Doppler image. As a result, the speckle noise can be reduced for the Doppler image.

As described above, a digital arrangement is used in the system of the second embodiment to obtain an arrangement simpler than that of the first embodiment system shown FIGS. 1A and 1B.

The present invention is not limited to the above embodiments. For example, the above processing can be applied to scanning method such as sector scanning, linear scanning, and convex scanning.

Additional advantages and modifications will be readily apparent to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for obtaining an ultrasound image by simultaneously receiving echo signals in an ultrasound diagnosis apparatus having a probe including a plurality of transducers, the method comprising the steps of:

transmitting an ultrasound beam to a desired point;

providing a plurality of ultrasound reception sections in the probe;

simultaneously receiving echo signals from the desired point by the ultrasound reception sections, each of the ultrasound reception sections including at least one of said plurality of transducers, the number of the transducers for each of the ultrasound reception sections being changed in accordance with an ultrasound propagation time;

delaying the echo signals simultaneously received in the ultrasound reception sections at delay times to be changed in accordance with the ultrasound propagation time, to produce a plurality of reception focus points on a line including the desired point;

adding the delayed echo signals within each of the ultrasound reception sections for each of the reception focus points;

detecting an image signal from the added echo signals for each of the ultrasound reception sections;

adding a plurality of image signals; and obtaining an ultrasound image from the added image signals.

2. The method according to claim 1, further comprising the step of displaying the obtained ultrasound image.

3. The method according to claim 1, wherein the delaying step including the step of multiplying the received echo signals using desired weighting functions.

4. The method according to claim 1, wherein the providing step includes the step for providing the ultrasound reception sections so that at least one of the transducers included in one ultrasound reception section is included in another ultrasound reception section.

5. A system for obtaining an ultrasound image by simultaneously receiving echo signals in an ultrasound diagnosis apparatus, the system comprising:

means for providing a plurality of ultrasound reception sections;

an ultrasound probe having a plurality of transducers for transmitting an ultrasound beam to a desired point, and simultaneously receiving echo signals from the desired point by the plurality of ultrasound reception sections, each of the ultrasound reception sections including at least one of said plurality of transducers, the number of the transducers for each of the ultrasound reception sections being changed in accordance with an ultrasound propagation time;

delaying means for delaying the echo signals simultaneously received in the ultrasound reception sections at delay times to be changed in accordance with the ultrasound propagation time, to produce a plurality of reception focus points on a line including the desired point;

means for adding the delayed echo signals within each of the ultrasound reception sections for each of the reception focus points;

detecting means for detecting an image signal from the added echo signals for each of the ultrasound reception sections;

means for adding a plurality of image signals; and obtaining means for obtaining an ultrasound image from the added image signals.

6. The system according to claim 5, further comprising means for displaying the obtained ultrasound image.

7. The system according to claim 5, wherein the delaying means includes means for multiplying the received echo signals using desired weighting functions.

8. The system according to claim 5, wherein the providing means includes means for providing the ultrasound reception sections so that at least one of the transducers included in one ultrasound reception section is included in another ultrasound reception section.

9. A system for obtaining an ultrasound image by simultaneously receiving echo signals in an ultrasound diagnosis apparatus, the system comprising:

means for providing a plurality of ultrasound reception sections;

an ultrasound probe having a plurality of transducers for transmitting an ultrasound beam to a desired point, and simultaneously receiving echo signals from the desired point by the plurality of ultrasound reception sections, each of the ultrasound reception sections including at least one of said plurality of transducers, the number of the transducers for each of the ultrasound reception sections being changed in accordance with an ultrasound propagation time;

delaying means having a digital delay circuit for delaying the echo signals simultaneously received in the ultrasound reception sections at delay times changed in accordance with the ultrasound propagation time, to produce a plurality of reception focus points on a line including the desired point;

means for adding the delayed echo signals within each of the ultrasound reception sections for each of the reception focus points;

a detecting circuit for detecting an image signal from the added echo signals for each of the ultrasound reception sections;

means for adding a plurality of image signals; and obtaining means for obtaining an ultrasound image from the added image signals.

* * * * *